(12) United States Patent
Frazier et al.

(10) Patent No.: US 9,069,629 B2
(45) Date of Patent: Jun. 30, 2015

(54) BIDIRECTIONAL COUNTING OF DUAL OUTCOME EVENTS

(71) Applicant: International Business Machines Corporation, Armonk, NY (US)

(72) Inventors: Giles Roger Frazier, Austin, TX (US); Venkat R. Indukuru, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/833,776

(22) Filed: Mar. 15, 2013

(65) Prior Publication Data

US 2014/0282616 A1    Sep. 18, 2014

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/54* | (2006.01) | |

(52) U.S. Cl.
CPC ........................................ *G06F 9/542* (2013.01)

(58) Field of Classification Search
CPC ........................................................ G06F 9/542
USPC ............................................................ 719/318
See application file for complete search history.

(56) References Cited

U.S. PATENT DOCUMENTS

| | | | | |
|---|---|---|---|---|
| 5,857,104 | A  * | 1/1999 | Natarjan et al. | 717/158 |
| 6,356,615 | B1 * | 3/2002 | Coon et al. | 377/16 |
| 6,678,777 | B2 * | 1/2004 | Rao et al. | 710/305 |
| 2004/0210749 | A1 * | 10/2004 | Biles | 712/240 |
| 2007/0204137 | A1 * | 8/2007 | Tran | 712/214 |
| 2008/0250233 | A1 * | 10/2008 | Marden et al. | 712/228 |
| 2012/0046912 | A1 | 2/2012 | Indukuru et al. | |

* cited by examiner

*Primary Examiner* — Timothy A Mudrick
(74) *Attorney, Agent, or Firm* — DeLizio Gilliam, PLLC

(57) ABSTRACT

A dual outcome event monitoring unit comprises a plurality of inputs, and a first counter. Each input is associated with an event and the first counter is a bidirectional counter. The dual outcome event monitoring unit is configured to increment the first counter in response to receiving an indication of the occurrence of a first event of a plurality of events. The first event is designated as an increment event. The dual outcome event monitoring unit is also configured to decrement the first counter responsive to receiving an indication of the occurrence of a second event of a plurality of events. The second event is designated as a decrement event.

16 Claims, 4 Drawing Sheets

BIDIRECTIONAL COUNTING OF DUAL OUTCOME EVENTS

BACKGROUND

Embodiments of the inventive subject matter generally relate to the field of computing systems, and, more particularly, to processor design.

Computer processors continue to advance and increase in complexity. Instead of merely executing instructions and performing other related operations, processors can also be designed to monitor various aspects of their operation. Processors can be designed to modify how various operations are performed based on the monitoring of their operations. For example, various techniques can be used to manage a processor cache, such as "first in first out" and "least recently used" techniques. However, each technique can perform differently under varying operating conditions such that in some scenarios a first technique may perform better than a second, while in other scenarios the second technique performs better than the first. Processors can be designed to monitor such events, and if a certain threshold is reached, switch to using a different technique.

SUMMARY

Embodiments of the inventive subject matter generally include a dual outcome event monitoring unit. The dual outcome event monitoring unit includes a plurality of inputs and a first counter. Each input of the plurality of inputs is associated with an event and the first counter is a bidirectional counter. The dual outcome event monitoring unit is configured to increment the first counter in response to receiving an indication of the occurrence of a first event of a plurality of events. The dual outcome event monitoring unit is also configured to decrement the first counter responsive to receiving an indication of the occurrence of a second event of a plurality of events. The first event is designated as an increment event and the second event is designated as a decrement event.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
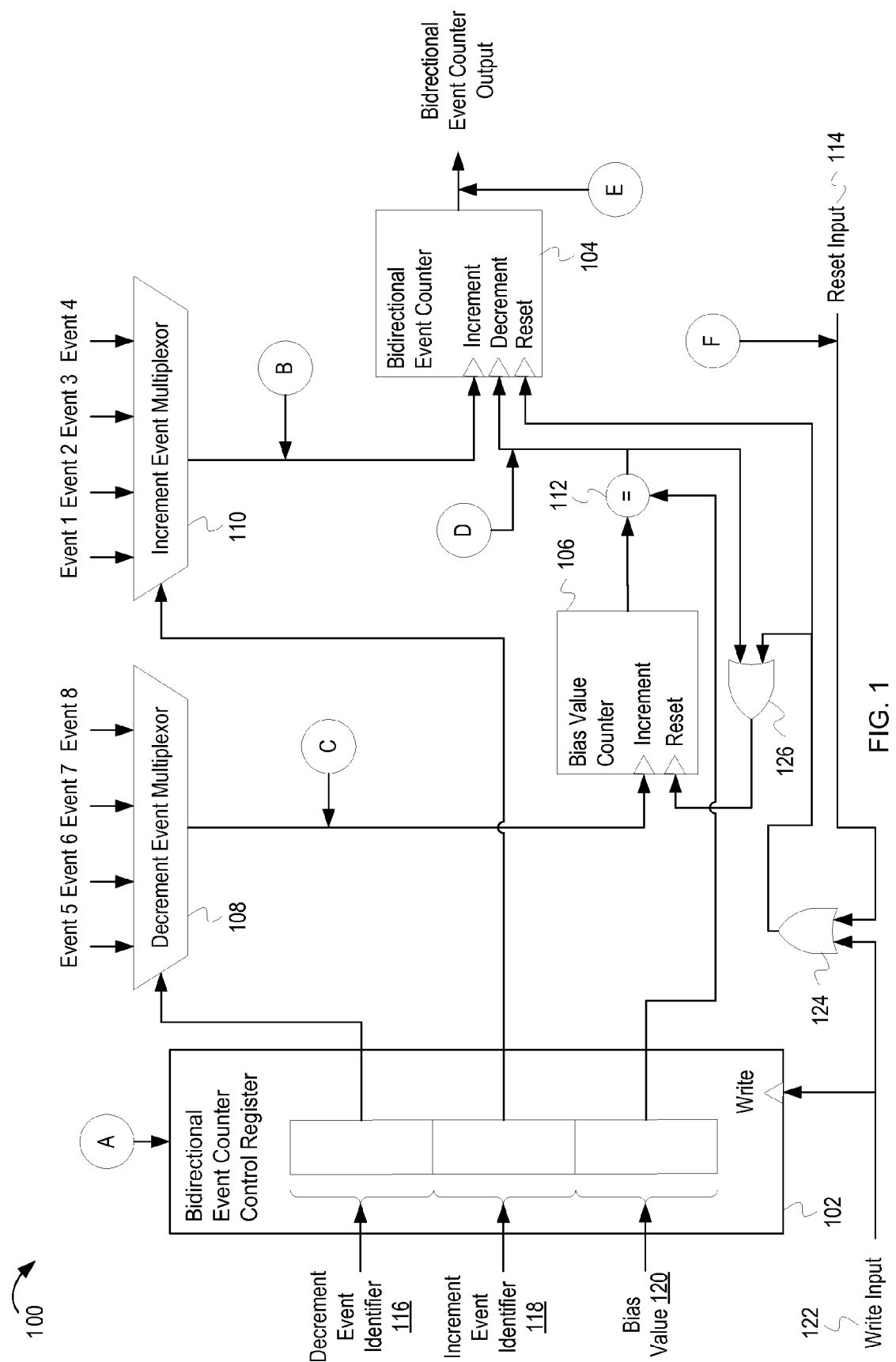
FIG. 1 depicts the components and operations of a processor with a dual outcome event monitoring unit according to embodiments.

The description that follows includes example systems, methods, techniques, instruction sequences and computer program products that embody techniques of the present inventive subject matter. However, it is understood that the described embodiments may be practiced without these specific details. For instance, although examples refer to dual outcome events, two single outcome events can also be used. In other instances, well-known instruction instances, protocols, structures and techniques have not been shown in detail in order not to obfuscate the description.

Processors are frequently designed with various techniques to track performance, monitor operation parameters, etc. For example, the various components of a processor can, in various embodiments, include counters that are incremented each time particular events occur. These counters can be read and reset at various intervals to determine the rates that the events occur as well. Thus, a cache controller can increment a counter each time a cache miss occurs, then read the counter and reset it every ten thousand clock cycles to determine the rate at which cache misses occur.

However, each counter and associated hardware takes up space on the processor, and only some events may be of interest to the monitoring hardware or software. Thus, in various embodiments, processors can further be designed to include a set of counters that can be incremented by a variety of selectable events. For example, a processor may include ten counters, each with an associated multiplexor. The inputs to the multiplexor can come from various components of the processor, each of which sends a signal to the multiplexor input when a particular event occurs. The multiplexor input associated with an event of interest to the monitoring hardware or software can then be selected. Thus, the amount of space used by counters and associated hardware is reduced.

Furthermore, each counter is limited by the bit-width of the counter. Thus, for events that can have a high count or are read after long intervals, the counter can overflow. When the counter overflows, the monitoring hardware or software can be notified or the counter is reset without notification. To prevent counter overflows, the size of the counter is increased, taking up even more space on the processor.

Some events, hereinafter referred to as "dual outcome events," can generate two different outcomes. For example, when a conditional branch instruction is executed, the conditional branch may be taken or may not be taken. Knowing the number of times conditional branches are taken relative to the number of times conditional branches are not taken can provide more information than merely counting the number of conditional branches taken or the total number of conditional branches. Thus, a second counter can be added to either count the number of times a first outcome occurred or count the number of times a second outcome occurred. However, for each possible dual outcome event to be tracked, a second counter is added, doubling the amount of space used for monitoring each dual outcome event. However, for some of these dual outcome events, the statistic that is most relevant is not the absolute number of each outcome, but rather the relative frequency with which each occurs. For example, whether a conditional branch instruction is taken or not is useful for optimizing branch prediction. However, the absolute number of times a conditional branch instruction is taken or not can be less useful than the ratio of the conditional branch being taken and the conditional branch not being taken.

An "outcome" can be considered an event. For example, the execution of a conditional branch instruction is a dual outcome event. One outcome is that the conditional branch is taken and the second outcome is that the conditional branch is not taken. However, when viewed individually, each outcome can be classified as a single outcome event. Thus, a dual outcome event can also be thought of as an event that is defined as occurring when one of two events occurs. Even though many of the following examples discuss dual outcome events in which each outcome is related, a dual outcome event can be defined as having two outcomes that do not appear related. For example, a dual outcome event can be defined as occurring when either a cache miss occurs or a conditional branch is taken. The relative frequency of these particular events, although seemingly less related than a cache hit and cache miss, may still indicate a particular problem or provide useful information. Thus, even though the following examples may refer to dual outcome events that have highly related outcomes, the inventive subject matter is not so limited.

Thus, in various embodiments, a processor can include bidirectional counting of dual outcome events utilizing a single bidirectional counter. When a first outcome of a dual outcome event occurs, the counter associated with the dual outcome event is incremented. When the second outcome of the dual outcome event occurs, the counter associated with the dual outcome event is decremented. This allows the processor to track the relative occurrences of the outcomes using a single counter. Additionally, because the counter is decremented, the counter will not overflow as soon as a unidirectional counter, allowing for smaller counters to be used. To further reduce the chances of overflow, and allow for a smaller counter, a bias value can be applied to the counter. For example, the counter may be incremented each time a first outcome of a dual outcome event occurs, but only be decremented when the second outcome occurs ten times. Thus, if one outcome of a particular dual outcome event may occur with greater probability than the other, the counting of the more probable event can be reduced while still allowing the proper ratio to be derived.

FIG. 1 depicts the components and operations of a processor with a dual outcome event monitoring unit according to embodiments. FIG. 1 depicts a dual outcome event monitoring unit (hereinafter "monitoring unit") 100, including a bidirectional event counter control register (hereinafter "control register") 102, a bidirectional event counter (hereinafter "event counter") 104, a bias value counter 106 and equality testing unit 112. The monitoring unit 100 also includes a decrement event multiplexor 108 and an increment event multiplexor 110. The monitoring unit 100 has a reset input 114, and the control register 102 value represents a decrement event identifier 116, increment event identifier 118 and a bias value 120. The monitoring unit 100 also includes a write input 122 and two OR gates 124 and 126.

The control register 102 includes at least one input designated for writes to the control register 102. In some implementations, the control register can have multiple write inputs, each input associated with a component of the register value, such as the bias value 120. The control register 102 also includes a write input connected to the monitoring unit 100 write input 122. The control register 102 includes three outputs: one output to the decrement event multiplexor 108, one output to the increment event multiplexor 110 and one output to the equality testing unit 112. The event counter 104 includes three inputs: an increment input from the increment event multiplexor 110, a decrement input from the equality testing unit 112, and a reset input from the monitoring unit 100 reset input 114. The event counter 104 includes one output from which the event counter is read, and the destination of the event counter 104 output can vary between implementations. For example, the event counter 104 output can be connected, directly or indirectly, with a separate performance management unit or a component that allows communication with the operating system. The bias value counter 106 includes an increment input from the decrement event multiplexor 108 and a reset input from the monitoring unit 100 reset input 114. The bias value counter 106 includes one output to the equality testing unit 112, from which the bias value counter 106 value is read. The decrement event multiplexor 108 includes at least one event input (four are depicted) and one selector input. The decrement event multiplexor 108 includes one output to the bias value counter 106 increment input. The increment event multiplexor 110 includes at least one event input (four are depicted) and one selector input. The increment event multiplexor 108 includes one output to the event counter 104 increment input. The equality testing unit 112 includes one input from the bias value counter 106 and one input from the control register 102. The equality testing unit 112 includes one output to the event counter 104 decrement input.

Whereas the bias value counter 106 can be an unsigned counter, in some embodiments, the event counter 104 can be a signed counter, thus supporting negative values. A signed counter can be implemented by using one bit of the counter to represent the sign, with the additional bits representing the magnitude. In some embodiments, the bias value counter 106 and/or the event counter 104 can be integer counters. In some embodiments, the bias value counter 106 and/or the event counter 104 can be implemented as floating point counters, allowing them to store large values.

At stage A, a value is written to the control register 102 specifying a decrement event identifier 116, an increment event identifier 118 and a bias value 120. The bits associated with the decrement event identifier 116 are output to the selector input of the decrement event multiplexor 108. The bits associated with the increment event identifier 118 are output to the selector input of the increment event multiplexor 110. The decrement event identifier 116 and the increment event identifier 118 correspond to an input to the respective multiplexor. For example, if the decrement event identifier 116 is set to 0b00, a first input of the decrement event multiplexor 108 is selected; if the decrement event identifier 116 is set to 0b01, a second input of the decrement event multiplexor 108 is selected, etc. The bits associated with the bias value 120 are output to the equality testing unit 112. To write to the control register 102, a component (not depicted) writing the values to the control register 102 sends a value to the monitoring unit 100 write input 122.

The number of bits stored in the control register 102 can vary based on the implementation. For example, the number of bits assigned to the decrement event identifier 116 can correspond to the number of inputs to the decrement event multiplexor 108. For example, if the decrement event multiplexor 108 has four inputs, four bits in the control register 102 assigned to the decrement event identifier 116 are sufficient to select any of the four inputs. The number of bits assigned to the bias value 120 is sufficient to cover the highest allowable bias value 120 if the bias value 120 represents a number. However, the bias value 120 can be encoded in a variety of other ways. For example, the bias values can be restricted to powers of ten, with the bits associated with the bias value 120 representing the power. In other words, the set of possible bias values may be 1, 10, 100, 1000, etc. A value of 0b00 stored in the bits associated with the bias value 120 indicates that the bias value is 1; a value of 0b01 stored in the bits associated with the bias value 120 indicates that the bias value is 10, etc. In some implementations, the equality testing unit 112 is designed to derive the actual bias value from the encoding stored in the bits associated with the bias value 120. In some implementations, the control register 102 is designed to output the actual bias value based on the encoding stored in the bits associated with the bias value 120. In some implementations, a separate unit (not depicted) that derives the actual bias value from the encoding stored in the bits associated with the bias value 120 is included between the bias value 120 output and the equality testing unit 112. The control register 102 is not limited to the sum of the number of bits used for the decrement event identifier 116, increment event identifier 118 and the bias value 120, and can include additional bits. Furthermore, the number of bits in the control register 102 can vary in some implementations, such as those described below.

The control register 102 can be written to by hardware, software, or a combination thereof. For example, the Instruction Set Architecture (hereinafter ISA) can be implemented to allow an operating system to write to the control register 102. When the operating system determines that an event should be tracked, the operating system writes a value to the control register 102 corresponding to the appropriate decrement event identifier 116 and increment event identifier 118, as well as an appropriate bias value 120. Additional hardware can be designed to similarly change which events are monitored. For example, a computing system can include a separate processor dedicated to performance management and/or power management. The performance/power management processor can determine which events should be monitored. A combination of hardware and software can be utilized to set the value as well. For example, the operating system can indicate to a performance management processor that a particular type of performance, such as cache performance, is important to a particular application. The performance management processor can then write the appropriate values to the control register 102 to indicate that cache misses and cache hits should be monitored. The performance management processor monitors the event counter 104 and changes the cache replacement policy based on the event counter 104.

The control register 102 can be implemented to support partial writes, in which the bits associated with the decrement event identifier 116, the increment event identifier 118 and the bias value 120 can be written independently. For example, if bits four through seven were assigned to the increment event identifier 118, a component that could write to the control register 102 could write a value to bits four through seven without writing values to the additional bits. Additionally, as described above, the control register 102 can be implemented with multiple inputs associated with each component of the register value.

At stage B, an increment event occurs and the event counter 104 is incremented. When the control register 102 was written to at stage A, the increment event multiplexor 110 input was selected as described above. Thus, whenever a value is transmitted to the input of the selected increment event multiplexor 110 input, the value is transmitted through the increment event multiplexor 110. The output of the increment event multiplexor 110 is connected, directly or indirectly, to the increment input of the event counter 104. Thus, when a value is transmitted to the input of the selected increment event multiplexor 110 input, the value is transmitted to the event counter 104 increment input. When a value is received at the event counter 104 increment input, the event counter 104 is incremented by one.

At stage C, a decrement event occurs and the bias value counter 106 is incremented. Similar to the increment event multiplexor 110, when the control register 102 was written to at stage A, the decrement event multiplexor 108 input was selected as described above. Thus, whenever a value is transmitted to the input of the selected decrement event multiplexor 108 input, the value is transmitted through the decrement event multiplexor 108. The output of the decrement event multiplexor 108 is connected, directly or indirectly, to the increment input of the bias value counter 106. Thus, when a value is transmitted to the input of the selected decrement event multiplexor 108 input, the value is transmitted to the bias value counter 106 increment input. When a value is received at the bias value counter 106 increment input, the bias value counter 106 is incremented by one.

At stage D, the value stored in the bias value counter 106 is compared with the bias value 120 stored in the control register 102, or a value derived from the bias value 120 stored in the control register 102 (hereinafter "the bias value 120"). The equality testing unit 112 determines whether the bias value 120 is equal to the value stored in the bias value counter 106. The equality testing unit 112 output is connected, directly or indirectly, to the decrement input of the event counter 104. Thus, if bias value 120 and the value stored in the bias value counter 106 are equal, a value is transmitted to the decrement input of the event counter 104, resulting in the event counter 104 being decremented by one. The bias value counter 106, as described above, has a reset input. The output from the equality testing unit 112 is connected, directly or indirectly, to the bias value counter 106 reset input in addition to the bidirectional event counter 104 decrement input. When the value of the bias value counter 106 reaches the bias value 120, the bias value counter is reset. The monitoring unit 100 reset input 114 can also be connected, directly or indirectly, to the bias value counter 106 reset input, as described below. The OR-gates 124 and 126 allows the bias value counter 106 to be reset by either the equality testing unit 112 or the monitoring unit reset input 114. Additionally, the OR-gates 124 and 126 allow the write input 122 to reset the bias value counter 106.

When combined with the components and operations described at other stages, the operation of the bias value counter 106 allows dual outcome events in which one outcome may have a higher probability of occurrence than the second outcome to be more efficiently monitored. For example, assume the processor implements branch prediction, with the goal of correctly predicting whether a conditional branch will be taken or not ninety-nine percent of the time. One of the inputs into the increment event multiplexor 110 is connected, directly or indirectly, to a first event output from a branch prediction unit. The branch prediction unit transmits a value on the first event output anytime a branch prediction is determined to be incorrect. Similarly, one of the inputs into the decrement event multiplexor 108 is connected, directly or indirectly, to a second event output from the branch prediction unit. The branch prediction unit transmits a value on the second event output anytime a branch prediction is determined to be correct. The monitoring unit 100 is configured to select the associated increment event multiplexor 108 and decrement event multiplexor 110 inputs by writing the appropriate values to the decrement event identifier 116 and increment event identifier 118, respectively. Furthermore, a value representing the number "ninety-nine" is written to the bias value 120. When functioning as described above, the event counter 104 is incremented each time a branch misprediction occurs. However, the event counter 104 is not decremented until the bias value counter 106 is incremented ninety-nine times, corresponding to ninety-nine correct branch predictions. Thus, assuming the event counter 104 begins at zero, the event counter 104 will remain at or near zero as long as the branch prediction unit accuracy remains at ninety-nine percent.

The event counter 104 value can vary significantly from zero or one, however. For example, assuming that branch mispredictions occur at random or semi-random intervals, it is possible that two branch mispredictions might occur during one set of one hundred branch predictions, while no branch mispredictions occur during the next two hundred branch predictions. Thus, assuming the aforementioned three hundred branch predictions are the only monitored branch predictions, after the first one hundred branch predictions the value of the event counter 104 is two. After the second one hundred branch predictions, the value of the event counter 104 is one, and after the third one hundred branch predictions, the value of the event counter 104 is zero.

In a scenario where the branch prediction unit accuracy differs from the goal of ninety-nine percent, the event counter 104 will drift from the baseline of zero. For example, if the accuracy over one thousand branch predictions is ninety percent, the value of the event counter 104 (assuming a bias value 120 of ninety-nine) will be ninety-one after the one thousand branch predictions (nine decrements and one hundred increments). On the other hand, if the branch prediction unit accuracy increased, the event counter 104 would drift below the baseline of zero.

At stage E, the value of the event counter 104 is read. Similar to the various implementations possible for writing to the control register 102 described above, the event counter 104 can be read by software, hardware or a combination thereof. For example, as described above, a computing system can be designed with a separate performance/power management processor. The performance/power management processor can read the event counter 104 as appropriate for the specific event being counted. Similarly, the ISA can be implemented to allow the operating system to read from the event counter 104, by reading from a specific memory location, for example.

The frequency with which the event counter 104 is read can vary between implementations and the nature of the event being counted. For example, if a dual outcome event is expected to occur frequently, the reads of the event counter 104 may be more frequent than if the event happens less frequently. Further, read frequency may change based on expected patterns in the event behavior. For example, in some implementations, processors can switch between executing multiple threads that rely on different data. After a processor switches threads, the cache miss rate may be high until the thread has executed for a particular number of cycles. Thus, a component monitoring the cache miss rate may wait until a certain number of cycles after a context switch occurred to allow the cache miss rate to settle from the initial spike. Some dual outcome events may follow a pattern in which one of the outcomes occurs more frequently for a short period of time, followed by the other outcome occurring more frequently for a short period of time. The component monitoring such an event may make frequent reads, allowing the monitoring component to calculate a more accurate average value or in order to obtain data on which to base adjustments to processing hardware.

At stage F, the monitoring unit 100 receives a value on the reset input 114. The reset input 104, as described above, is connected, directly or indirectly, to the bias value counter 106 and to the event counter 104 reset inputs. Upon receiving a value from the reset input 114, the event counter 104 and bias value counter 106 are reset to zero. Also, when the control register 102 receives a value from the monitoring unit 100 write input 122, the control register 102 is written with a new value, the bias value counter 106 reset input is activated and the bidirectional event counter 104 reset input is activated. This permits changes to the control register 102 to be synchronized with the resetting of the bias value counter 106 and the event counter 104. Synchronizing changes to the control register 102 with the resetting of the bias value counter 106 and the event counter 104 prevents scenarios where the bias value counter 106 and event counter 104 contain values from a previous event.

Resets can also occur to correct for periodic, but expected, drift of the event counter 104. For example, as described above, the bias value 120 can represent an encoding of the actual bias value by representing a power of ten. Thus, any ratio of dual outcomes that is not equal to a power of ten will tend to drift. In other words, if the expected ratio of cache hits to misses is one hundred and fifty to one, and the closest bias value that can be represented by the stored bias value 120 is one hundred, the event counter 104 will slowly drift away from zero in the negative direction. Thus, the bias value counter 106 and event counter 104 can be reset periodically to prevent overflows.

In some implementations, the decrement event multiplexor 108 and increment event multiplexor 110 are implemented as one multiplexor. The combined multiplexor includes pairs of inputs. Each pair represents the two outcomes of a dual outcome event. The combined multiplexor also includes two outputs, a decrement event output and an increment event output. The decrement event output is connected, directly or indirectly, to the increment input of the bias value counter 106 and the increment event output is connected, directly or indirectly, to the increment input of the event counter 104. The control register 102 can be modified to only include one event identifier, which corresponds to a pair of inputs. Additionally, in some implementations, the control register 102 only includes one event identifier, while the decrement event multiplexor 108 and increment event multiplexor 110 remain separate. The single event identifier indicates the input for both the decrement event multiplexor 108 and the increment event multiplexor 110. Thus, the inputs to the decrement event multiplexor 108 and the increment event multiplexor 110 corresponding to the value 0b00 constitute a pair of inputs, similar to an embodiment with a single multiplexor. Utilizing a single multiplexor can reduce the space and complexity of the monitoring unit 100, but can reduce flexibility by only allowing specific pairs of events to be selected instead of individual events. In some implementations, the bias value counter 106 is connected, directly or indirectly, to the increment event multiplexor 110 or increment event output of a combined multiplexor. Thus, instead of biasing the decrement events, the increment events can be biased as described above.

In some implementations, the monitoring unit 100 is designed to transmit a notification when the event counter 104 overflows or underflows. For example, the event counter 104 can include an additional output (not shown in FIG. 1) that is connected, directly or indirectly, to a performance/power management chip. The additional output can also generate a software interrupt that notifies the operating system that an overflow or underflow has occurred. This can be utilized by the monitoring component to determine when the ratio of the event outcomes is beyond an acceptable range instead of reading the event counter 104.

Although the components of FIG. 1 are depicted as hardware, they can be implemented as software or a combination of hardware and software. For example, instead of causing a change to the event counter 104, a software interrupt can be generated anytime a value is transmitted to the current inputs. Thus, the operating system or other software can function as the event counter 104.

Although the connections between components of the monitoring unit 100 are depicted as single lines, any combination of all, some or none of the connections can comprise multiple connections. For example, if the decrement event identifier is eight bits wide, the connection between the control register 102 and the decrement event multiplexor 108 can be eight bits wide, allowing transmission of each bit of the decrement event identifier in parallel.

The term "value" is used to describe the inputs and outputs monitoring unit 100 components. A "value" can be represented in a variety of ways and can vary between implementations. For example, the connections between the monitoring unit 100 components can be wires. A "value" on a wire can be represented as a voltage level, such as a low voltage representing a zero and a high voltage representing a one. In a software implementation, the connections between the monitoring unit 100 components can be function calls, and the values can be represented as Boolean values, integers, etc. In implementations combining hardware and software components, a combination of representations of a "value" can be used.

The event counter 104 can function as a unidirectional counter as well. For example, the decrement event multiplexor 108 can include an input that is not connected to another component, therefore not receiving an input signal. If the unconnected input is selected, the event counter 104 is only incremented, functioning as a unidirectional counter. In an implementation in which the decrement event multiplexor 108 and the increment event multiplexor 110 are combined into a single multiplexor, some inputs can be a single input instead of a pair of inputs, thus functioning similarly to a multiplexor with an unconnected input. Similarly, the bias value counter 106 can be used to apply the bias value 120 to single outcome events. In other words, the increment event multiplexor 110 can be implemented with unconnected inputs, similar to the decrement event multiplexor 108. If the bias value 120 is set to represent the number ten, the event counter 104 would represent the number of decrement events divided by ten. In such implementations, a component reading the event counter 104 could ignore the sign bit and just use the bits representing the magnitude.

Figure 2:
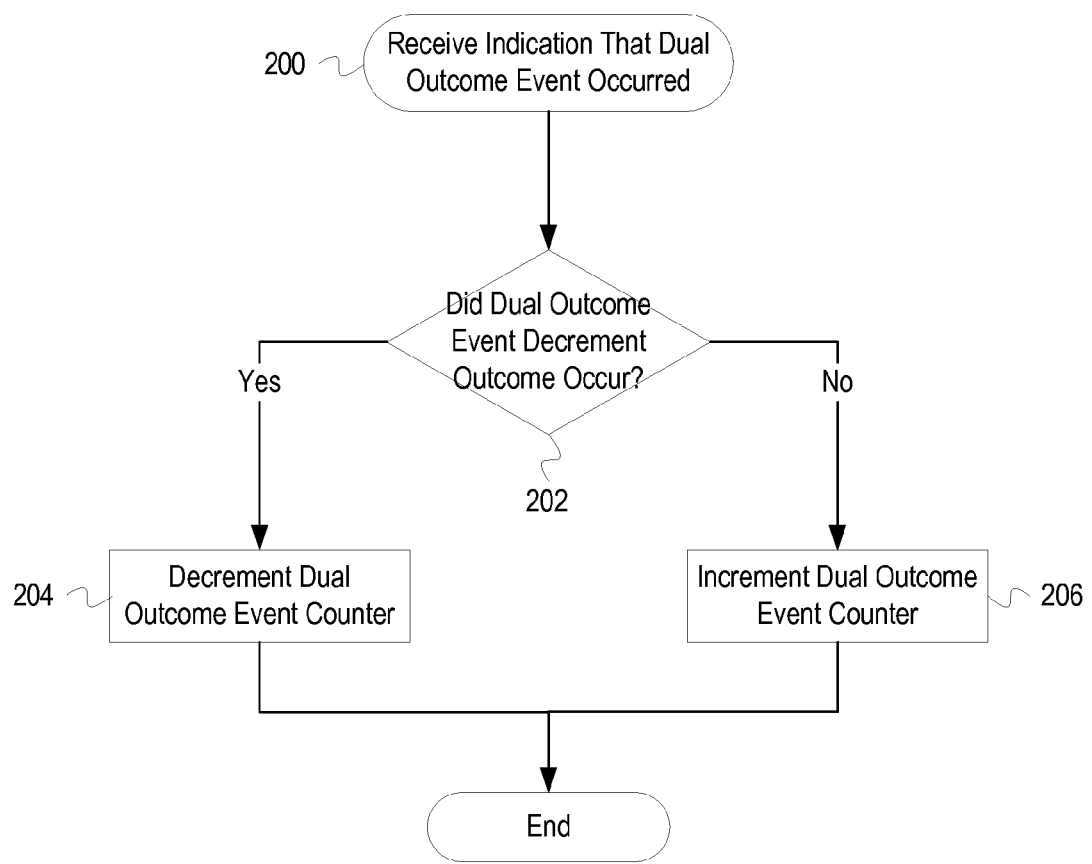
FIG. 2 depicts a flowchart of example operations for implementing a dual outcome event monitoring unit.

FIG. 2 depicts a flowchart of example operations for implementing a dual outcome event monitoring unit.

At block 200, a dual outcome event (hereinafter "event") monitoring unit (hereinafter "monitoring unit"), such as depicted in FIG. 1, receives an indication that a dual outcome event has occurred. The indication can vary between implementations. For example, in a hardware implementation as described with FIG. 1, the indication can be a value transmitted along a particular wire. Each input to a multiplexor corresponds to a particular outcome for a particular event, and a high voltage transmitted to a particular input indicates that the corresponding outcome for the particular event occurred. In a software implementation, the indication can be implemented by passing a particular value as a parameter to a function. For example, a particular function can be called with an integer value corresponding to an event or outcome identifier. Indications can also vary within a single implementation. For example, the monitoring unit can be implemented using a combination of hardware and software. The software components of the monitoring unit may use an integer outcome/event identifier, which is converted to or from a high voltage on a particular wire within the hardware component of the monitoring unit. After the indication that a dual outcome event has occurred, control then flows to block 202.

At block 202, the monitoring unit determines whether the event outcome was a decrement outcome or increment outcome. The manner in which the monitoring unit makes the determination can vary between implementations, similar to above. For example, in an implementation with two multiplexors, such as that in FIG. 1, the determination is made based on which multiplexor the indication of the event outcome was transmitted to. In a hardware implementation with one multiplexor, each event can have a pair of inputs into the multiplexor, with one input designated as being the increment event and the other input designated as being the decrement event. In a software implementation, the determination can be made by comparing an outcome identifier with a list of outcome identifiers designated as decrement outcomes. If the outcome identifier is found in the list of decrement outcome identifiers, the outcome is a decrement event, otherwise the outcome is an increment event. If it is determined that the event outcome is a decrement outcome, control then flows to block 204. If it is determined that the event outcome is an increment outcome, control then flows to block 206.

At block 204, the monitoring unit decrements the dual outcome event counter (hereinafter "event counter"). The manner in which the counter is decremented can vary between implementations. For example, in an implementation utilizing a bidirectional hardware counter, the monitoring unit can transmit a value to the decrement input of the bidirectional hardware counter. Upon receiving a value on the decrement input, the bidirectional hardware counter value is decremented by one. In a software implementation, the value of a variable representing the event count can be decremented by one. After decrementing the event counter, the process ends.

Control flowed to block 206 if the monitoring unit determined the event outcome was an increment outcome at block 202. At block 206, the monitoring unit increments the event counter. The event counter can be incremented similarly to decrementing the event counter, as discussed above. For example, if the event counter is implemented using a bidirectional hardware counter, a value can be transmitted to the increment input of the bidirectional hardware counter, instead of the decrement input. In a software implementation, the value of the variable representing the event counter can be incremented by one. After incrementing the event counter, the process ends.

Figure 3:
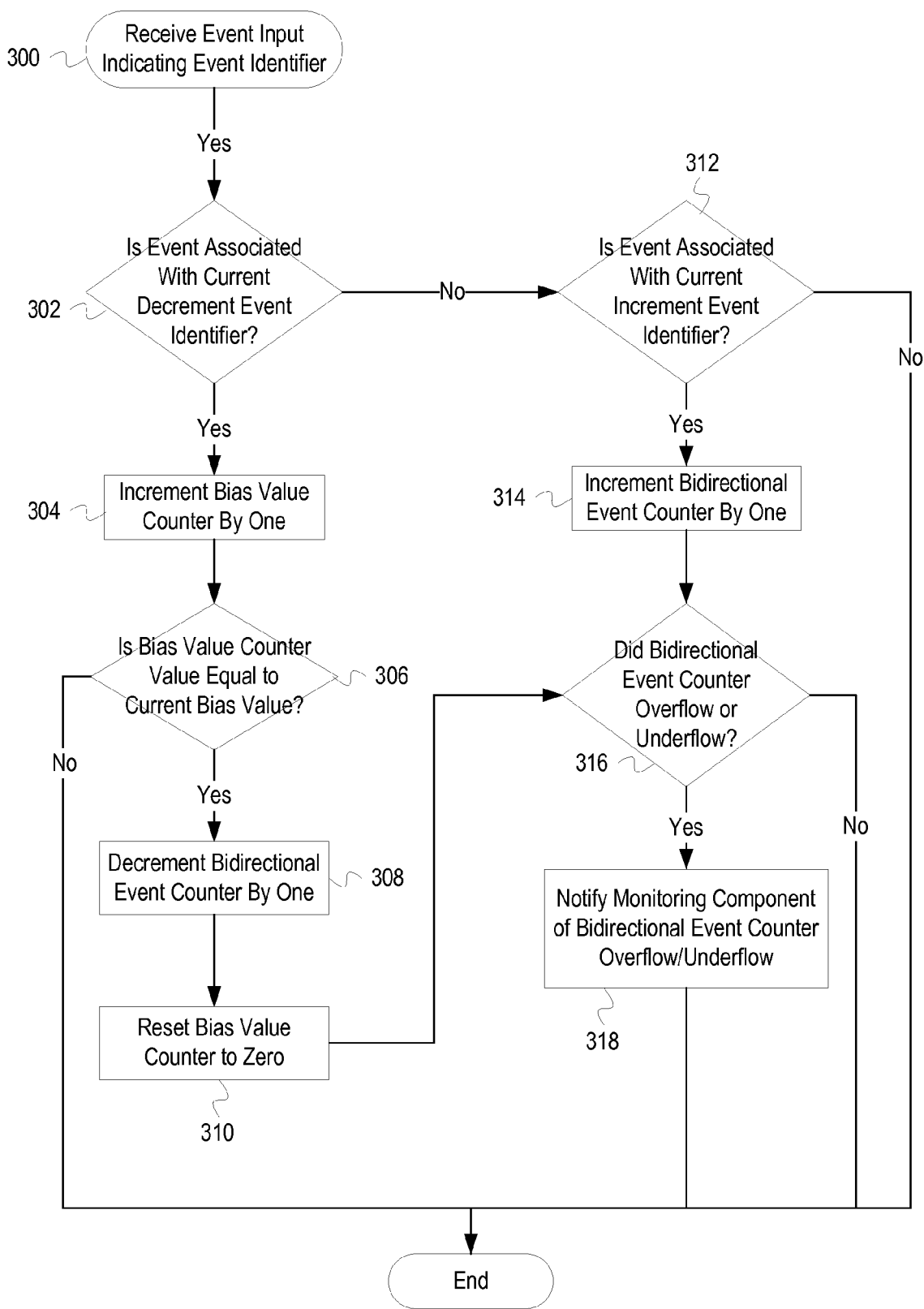
FIG. 3 depicts a flowchart of example operations for implementing a dual outcome event monitoring unit with selectable increment and decrement events, a bias value counter and counter overflow notifications.

FIG. 3 depicts a flowchart of example operations for implementing a dual outcome event monitoring unit with selectable increment and decrement events, a bias value counter and counter overflow notifications. A dual outcome event monitoring unit can embody functionality that allows another component to select which events or outcomes cause the counter to increment or decrement. A monitoring unit can also embody functionality that allows another component to specify a ratio with which the increment and decrement events occur.

At block 300, the monitoring unit receives an event input indicating an event identifier. The event input is any indication that an event occurred. The event input can vary between implementations. For example, in a hardware implementation such as that described in FIG. 1, any value transmitted to one of the multiplexor inputs is an event input. In a software implementation, the event input can be a software interrupt generated by a processor or a function call. The indication of the event identifier can similarly vary. For example, in a hardware implementation with a multiplexor, the event identifier can be the particular multiplexor input the value is transmitted to. In other words, each multiplexor input can be associated with a particular event identifier, thus allowing a single value, such as a high voltage transmitted on a wire, to indicate the event identifier. In a software implementation, the event identifier can be specified utilizing a value such as an integer. After receiving an event input indicating an event identifier, control then flows to block 302.

At block 302, the monitoring unit determines if the event that occurred is associated with the current decrement event identifier. In a hardware implementation that includes two multiplexors, such as the example illustrated in FIG. 1, any event indication that is directed to an input of the increment event multiplexor is not associated with the current decrement event identifier. In the case the event indication is directed to an input of the decrement event multiplexor, whether the event is associated with the current decrement event identifier is determined based on whether the particular multiplexor input is selected. In other words, if the indication of the event goes to a decrement event multiplexor input that is selected based on the current decrement event identifier, the association between the current decrement event identifier and the event is determined intrinsically. In a software implementation, an event identifier passed in as a parameter to a function call, for example, can be compared to a variable that stores the current decrement event identifier to determine whether the event which occurred is associated with the current decrement event identifier. The specific implementations can vary for both hardware and software implementations, however. If it is determined that the event which occurred is associated with the current decrement event identifier, control then flows to block 304. If it is determined that the event which occurred is not associated with the current decrement event identifier, control then flows to block 312.

At block 304, the bias value counter is incremented by one. The implementation of the bias value counter can vary between implementations. For example, the bias value counter can be implemented in hardware or software. The specific mechanism by which the bias value counter is incremented will vary accordingly. After incrementing the bias value counter, control then flows to block 306.

At block 306, the monitoring unit determines whether the bias value counter is equal to the current bias value. This can be implemented in a variety of ways. For example, in a hardware implementation such as that described with FIG. 1, hardware circuitry can be utilized to compare the current bias value as stored in a register with the value in the bias value counter. If the current bias value is equal to the value in the bias value counter, the circuitry can output a value, such as a high voltage. In a software implementation, the monitoring unit can compare a variable representing the bias value counter with a variable representing the current bias value. If it is determined that the bias value counter is equal to the current bias value, control then flows to block 308. If it is determined that the bias value counter is not equal to the current bias value, the process ends.

At block 308, the monitoring unit decrements the bidirectional event counter (event counter) by one. The event counter can be implemented in a variety of ways, as described above, and the manner in which the event counter is decremented will vary accordingly. After the event counter is decremented by one, control then flows to block 310.

At block 310, the bias value counter is reset to zero. In other words, once the bias value counter reaches the current bias value, the event counter is decremented (as described above) and the bias value counter is reset to zero to begin counting decrement events again. After the bias value counter is reset to zero, control then flows to block 316.

Control flows to block 316 from block 314 and block 310. At block 316, the monitoring unit determines if the event counter underflowed or overflowed. Underflow and overflow of the event counter can be detected in a variety of ways. In a hardware implementation, the event counter can detect the underflow or overflow by including an extra bit that is set when the event counter is incremented when all other counter bits representing the magnitude are set to one. If the monitoring unit detects that the underflow/overflow bit is set, it determines that the event counter underflowed or overflowed. In a software implementation, the variable representing the event counter value can be compared to a variable or constant representing the maximum value or minimum value of the event counter. Additionally, in either implementation, multiple levels of overflow or underflow can be defined. For example, in a hardware implementation, a set of registers can be added that are designated to store values indicating overflow or underflow levels. If the event counter is equal to the value stored in one register of the set of registers, it is determined to have overflowed or underflowed at that particular "level" or value. Software implementations can, similarly, include multiple variables representing the possible overflow or underflow values. If it is determined that the event counter underflowed or overflowed, control then flows to block 318. If it is determined that the event counter did not underflow or overflow, the process ends.

At block 318, the monitoring unit notifies an overflow/underflow monitoring component that the event counter overflowed or underflowed. The overflow/underflow monitoring component is any component that is designated to receive an output from the monitoring unit if the event counter overflows or underflows. For example, in a hardware implementation, any hardware component that is connected to the output on which a value is transmitted signifying an event counter overflows or underflows is an overflow/underflow monitoring component. In a software implementation, any code that is called, by way of a function call, for example, when the event counter overflows or underflows is an overflow/underflow monitoring component. Multiple components can be overflow/underflow monitoring components. In implementations that allow multiple levels of overflow or underflow, the notification can include an indication of the level, such as which register or variable held the value indicating the level or the actual value of the event counter itself. After the overflow/underflow monitoring component is notified, the process ends.

Control flowed to block 312 if the monitoring unit determined that the event was not associated with the current decrement event identifier at block 302. At block 312, the monitoring unit determines if the event that occurred is associated with the current increment event identifier. The monitoring unit makes the determination similarly to making the determination made at block 302. However, the determination is made utilizing components, such as multiplexors or variables, designated for increment events. If it is determined that the event is associated with the current increment event identifier, control then flows to block 314. If it is determined that the event is not associated with the current increment event identifier, the process ends.

At block 314, the event counter is incremented by one. As described in relation to block 304, the implementation of the event counter can vary, and the mechanism by which the event counter is incremented varies accordingly. After the event counter is incremented, control then flows to block 316.

As example flowcharts, the flowcharts depicted above present operations in an example order from which embodiments can deviate (e.g., operations can be performed in a different order than illustrated and/or in parallel). For example, FIG. 3 depicts the determination of whether an event is associated with a current decrement event identifier or current increment event identifier as two individual operations. However, in some implementations, only one of the two operations is performed because the event input is received by a component dedicated to either incrementing or decrementing the event counter.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
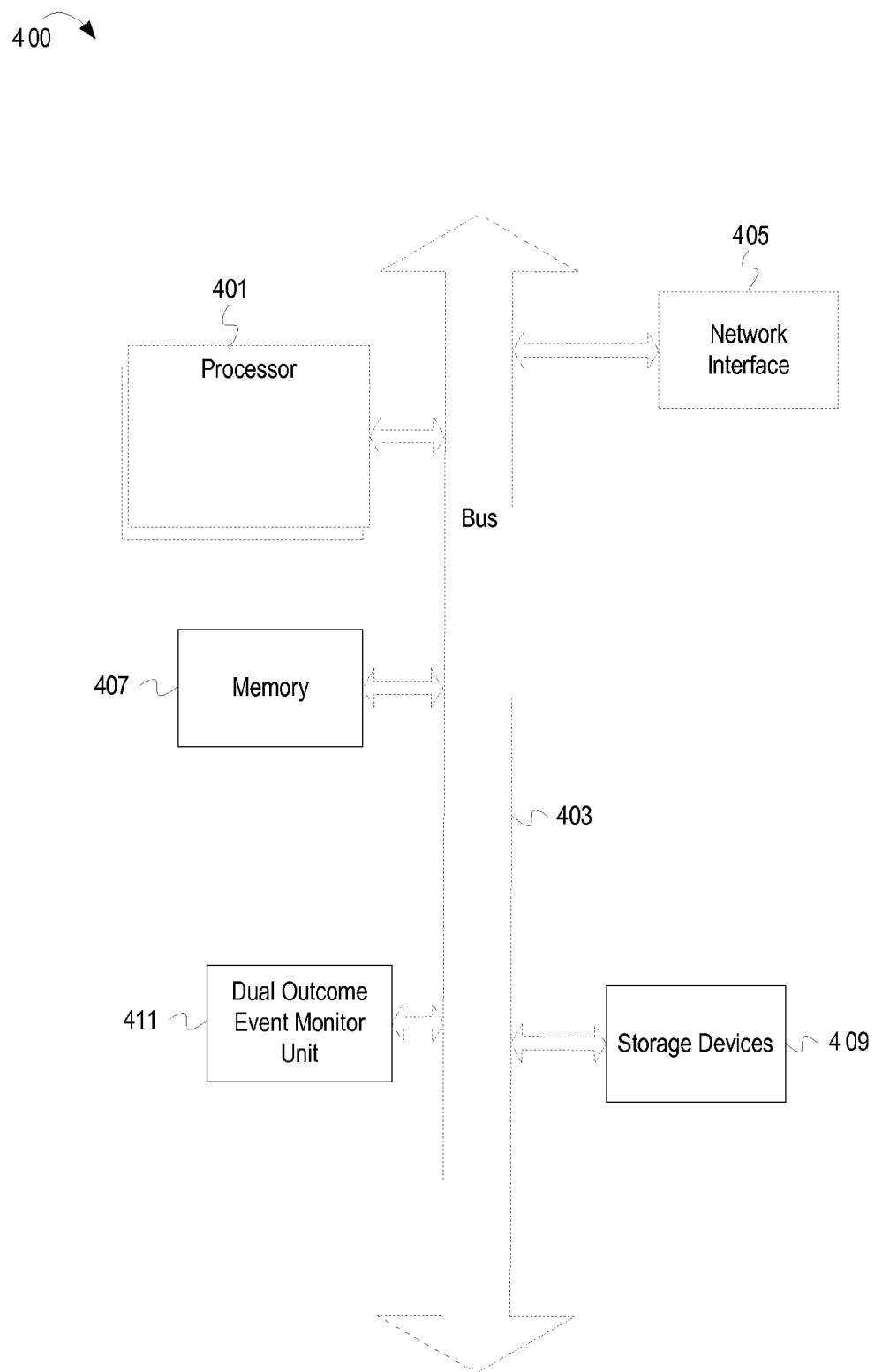
FIG. 4 depicts an example computer system including a dual outcome event monitor.

FIG. 4 depicts an example computer system including a dual outcome event monitor. A computer system includes a processor unit 401 (possibly including multiple processors, multiple cores, multiple nodes, and/or implementing multithreading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, Infini-Band®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The dual outcome event monitor 411 embodies functionality to implement embodiments described above. The dual outcome event monitor 411 may include one or more functionalities that facilitate the counting of events, including both dual outcome events and single outcome events. The dual outcome event monitor 411 may also include one or more functionalities that facilitate the application of a bias value to one or more events. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for processor design as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising a dual outcome event monitoring unit, the dual outcome event monitoring unit comprising:
    a first counter, wherein the first counter is a bidirectional counter;
    a register designated to host an event identifier; and
    a first multiplexor comprising a first plurality of inputs,
        wherein each input of the first plurality of inputs is associated with an event, wherein a signal on an input of the first plurality of inputs indicates an occurrence of the event associated with the input of the first plurality of inputs,
        wherein the first multiplexor is coupled with the first counter and an output of the register,
        wherein the first multiplexor is configured to select at least one input of the first plurality of inputs based on the event identifier hosted by the register;
    wherein the apparatus is configured to:
        increment the first counter in response to reception of an indication of an occurrence of a first event of a plurality of events, the first event being identified by a first event identifier hosted in the register;
        decrement the first counter in response to reception of an indication of an occurrence of a second event of the plurality of events, the second event being identified by the first event identifier hosted in the register;
        receive a second event identifier;
        in response to reception of the second event identifier, store the second event identifier in the register, and reset the first counter;
        increment the first counter in response to reception of an indication of an occurrence of a third event of the plurality of events, the third event being identified by the second event identifier hosted in the register; and
        decrement the first counter in response to reception of an indication of an occurrence of a fourth event of the plurality of events, the fourth event being identified by the second event identifier hosted in the register.

2. The apparatus of claim 1 further comprising:
    a second multiplexor comprising a second plurality of inputs;
        wherein each input of the second plurality of inputs is associated with an event, wherein a signal on an input of the second plurality of inputs indicates an occurrence of the event associated with the input of the second plurality of inputs;
        wherein the second multiplexor is coupled with the first counter and an output of the register; and
        wherein the second multiplexor is configured to select at least one input of the second plurality of inputs based on the first event identifier.

3. The apparatus of claim 2 further comprising a second counter,
    wherein the second multiplexor is coupled with the first counter via the second counter,
    wherein the register is further designated to host a bias value,
    wherein the apparatus is further configured to:
        increment the second counter in response to reception of the indication of the occurrence of the second event;
        determine whether the second counter is equal to the bias value; and
        decrement the first counter in response to a determination that the second counter is equal to the bias value.

4. The apparatus of claim 1, wherein the apparatus further comprises a plurality of registers, wherein the plurality of registers includes the register, wherein a bias value register of the plurality of registers is designated to host a bias value.

5. The apparatus of claim 1, wherein the apparatus is further configured to:
    read a value from the first counter; and
    in response to a reading of the value from the first counter, reset at least one of the first counter and a second counter.

6. The apparatus of claim 1 further comprising:
    a processor; and
    a computer readable storage medium having program instructions embodied therewith, the program instructions comprising program instructions that, when executed by the processor, cause the apparatus to,
        send the second event identifier to the dual outcome event monitoring unit;
        read a value from the first counter; and
        reset the first counter.

7. The apparatus of claim 1 further comprising a second counter, wherein the apparatus is further configured to:
    increment the second counter in response to reception of an indication of the occurrence of the second event of the plurality of events;
    determine that the second counter is equal to a bias value; and
    in response to a determination that the second counter is equal to the bias value,
        decrement the first counter; and
        reset the second counter.

8. A computer program product comprising:
    a computer readable storage medium having program instructions embodied therewith, the program instructions comprising program instructions to,
        receive, at a dual outcome event monitoring unit, an event indication from a processor;
        determine whether the event indication indicates an increment event or a decrement event;
        if the event indication indicates the increment event, increment a first counter, wherein the dual outcome event monitoring unit includes the first counter;
        if the event indication indicates the decrement event, increment a second counter;
        determine whether the second counter is equal to a bias value; and in response to a determination that the second counter is equal to the bias value, decrement the first counter.

9. The computer program product of claim 8, wherein the program instruction further comprise program instructions to:
   indicate that a first event is the increment event; and
   indicate that a second event is the decrement event.

10. The computer program product of claim 9, wherein the program instructions to indicate that the first event is the increment event comprise program instruction to:
    store a first event identifier to a memory location;
    wherein the program instructions to determine whether the event indication indicates the increment event or the decrement event comprise program instructions to compare the first event identifier with a second event identifier, wherein the event indication comprises the second event identifier.

11. The computer program product of claim 8, wherein the program instructions to indicate that the second event is the decrement event comprises computer usable program code configured to:
    store a third event identifier to the memory location;
    wherein the program instructions to determine whether the event indication indicates the increment or the decrement event further comprises program instructions to compare the third event identifier with the second event identifier.

12. The computer program product of claim 8, wherein the program instructions further comprise program instructions to:
    determine whether the first counter is equal to a maximum value, greater than the maximum value or has overflowed; and
    transmit a notification indicating that the first counter has reached the maximum value in response to a determination that the first counter is equal to a maximum value, greater than the maximum value or has overflowed.

13. An apparatus comprising a dual outcome event monitoring unit, the dual outcome event monitoring unit comprising:
    a bidirectional counter, wherein the bidirectional counter includes an increment input and a decrement input;
    a register designated to host a plurality of event identifiers;
    a first multiplexor comprising a first plurality of inputs, wherein each input of the first plurality of inputs is associated with an event, wherein the first multiplexor is configured to select at least one input of the first plurality of inputs based on a first of the plurality of event identifiers hosted by the register; and
    a second multiplexor comprising a second plurality of inputs, wherein each input of the second plurality of inputs is associated with an event, wherein the second multiplexor is configured to select at least one input of the first plurality of inputs based on a second of the plurality of event identifiers hosted by the register;
    wherein the apparatus is configured to:
      increment the bidirectional counter in response to reception of an indication of an occurrence of a first event of a plurality of events, the first event being identified by the first of the plurality of event identifiers hosted in the register;
      decrement the bidirectional counter in response to reception of an indication of an occurrence of a second event of the plurality of events, the second event being identified by the second of the plurality of event identifiers hosted in the register;
      receive a third event identifier;
      in response to reception of the third event identifier, store the third event identifier in the register; and reset the bidirectional counter; and
      increment the bidirectional counter in response to reception of an indication of an occurrence of a third event of the plurality of events, the third event being identified by the third event identifier hosted in the register.

14. The apparatus of claim 13 further comprising a bias value counter, wherein an output of the second multiplexor is coupled with the bias value counter, wherein an output of the bias value counter is coupled with the bidirectional counter, wherein the register is further designated to host a bias value.

15. The apparatus of claim 14, wherein the output of the bias value counter is coupled with the increment input of the bidirectional counter, wherein the apparatus is further configured to:
    increment the bias value counter in response to reception of an indication of the occurrence of the first event of a plurality of events;
    determine whether the bias value counter is equal to the bias value; and
    increment the bidirectional counter in response to a determination that the bias value counter is equal to the bias value.

16. The apparatus of claim 14, wherein the output of the bias value counter is coupled with the decrement input of the bidirectional counter, wherein the is further configured to:
    increment the bias value counter in response to reception of the indication of the occurrence of the second event of the plurality of events;
    determine whether the bias value counter is equal to the bias value; and
    decrement the bidirectional counter in response to a determination that the bias value counter is equal to the bias value.

* * * * *